(12) United States Patent
Chung et al.

(10) Patent No.: US 6,493,392 B1
(45) Date of Patent: Dec. 10, 2002

(54) METHOD FOR CODING DIGITAL INTERLACED MOVING VIDEO

(75) Inventors: Jae Won Chung, Seoul (KR); Jong Deuk Kim, Seoul (KR); Joo Hee Moon, Seoul (KR)

(73) Assignee: Hyundai Electronics Industries Co., Ltd., Ichon-shi (KR)

(*) Notice: Subject to any disclaimer, the term of this patent is extended or adjusted under 35 U.S.C. 154(b) by 0 days.

(21) Appl. No.: 09/472,002

(22) Filed: Dec. 27, 1999

(51) Int. Cl.[7] .................................................. H04N 7/12
(52) U.S. Cl. .......................... 375/240.27; 375/240.13; 375/240.26
(58) Field of Search ................. 375/240.13, 240.26, 375/240.28, 240.29, 240.27; 348/425.1, 425.2, 425.4, 415.1; 382/236, 238, 244, 232; 386/109, 111; 358/430, 261.2

(56) References Cited

U.S. PATENT DOCUMENTS

| | | | | |
|---|---|---|---|---|
| 4,329,708 A | * | 5/1982 | Yamamoto et al. | 348/617 |
| 4,680,638 A | * | 7/1987 | Childs | 348/97 |
| 4,788,679 A | * | 11/1988 | Katata et al. | 370/413 |
| 6,404,817 B1 | * | 6/2002 | Saha et al. | 375/240.27 |

OTHER PUBLICATIONS

Shahram Shirani et al., Error concealment methods, Feb. 1999, IEEE, 835–840.*
Myeong–Hoon et al., Error concealment for MPEG–2 video decoders with Enhanced coding mode estimation May 2000, IEEE, 46, 962–969.*

* cited by examiner

Primary Examiner—Vu Le
Assistant Examiner—Behrooz Senfi
(74) Attorney, Agent, or Firm—Jacobson Holman PLLC

(57) ABSTRACT

A method for coding a digital interlaced moving video. Picture-unit overhead information is first transmitted and it is then determined whether a video packet to be coded is a first packet of a given picture. A video packet header including overhead information for an interlaced decoding operation is transmitted if the video packet is not the first packet of the given picture. If the video packet is the first packet of the given picture or after the video packet header is transmitted, it is determined whether the given picture is an intra picture. If the given picture is the intra picture, the video packet is coded and transmitted in an interlaced intra picture manner. The video packet is coded and transmitted in an interlaced inter picture manner if the given picture is not the intra picture. If the video packet is not a last packet of the given picture, a digital interlaced coding operation is repeatedly performed. The digital interlaced coding operation is ended if the video packet is the last packet of the given picture. Even when the coded, interlaced moving video is transmitted through a channel where a transmission error may often occur, such as a mobile communication channel, a decoder can perform an error concealment operation of high performance to reconstruct a moving picture of high quality.

13 Claims, 13 Drawing Sheets

(a) interlaced frame  (b) field

METHOD FOR CODING DIGITAL INTERLACED MOVING VIDEO

BACKGROUND OF THE INVENTION

1. Field of the Invention

The present invention relates in general to the coding and decoding of a digital interlaced moving image or video, and more particularly to a method for coding and decoding a digital interlaced moving video, in which the digital interlaced moving video is compression-coded and transmitted with a degradation resulting from a transmission error or channel error being minimized, so that a moving picture of high quality can be reconstructed.

2. Description of the Prior Art

A scanning system for a digital moving video may generally be classified into a progressive type and an interlaced type. In the progressive scanning system, as shown in FIG. 1a, a video frame or picture (these two terms will hereinafter be used together to mean the same thing) is constructed by obtaining and scanning all pixels in the frame at the same time. In the interlaced scanning system, as shown in FIG. 1b, the pixels in the frame are partitioned into a top field as indicated by solid lines and a bottom field as indicated by dotted lines. The pixels in the top and bottom fields are obtained and scanned at different times. Namely, in the interlaced scanning system, a video frame is constructed by alternately obtaining and scanning each pixel line of the top field and each pixel line of the bottom field as indicated by the mixed solid and dotted lines.

In the interlaced scanning system, as shown in FIG. 1b, there is a time difference between the top and bottom fields. In FIG. 1b, the top field is shown to be earlier in time than the bottom field. But, the bottom field may be earlier in time than the top field in some cases. Due to such a time difference between the top and bottom fields, there may be different signal characteristics between adjacent scanning lines in the interlaced video frame. In other words, in the interlaced video frame, a signal characteristic of an with scanning line may be different from that of an (i+1)th or (i−1)th scanning line. However, the signal characteristic of the ith scanning line may be relatively high in correlation with that of an (i+2)th or (i−2)th scanning line in the same field, obtained at the same time. This phenomenon becomes more conspicuous as the motion of an object or objects on a video screen becomes larger in scale. For this reason, in the case where video coding techniques developed according to progressive video characteristics, such as motion estimation, motion compensation and discrete cosine transform (DCT), are applied to the coding of a video with interlaced video characteristics, a coding efficiency or coding gain is reduced.

In order to overcome such a coding efficiency reduction, research has been done for interlaced coding techniques such as field-based motion estimation, field-based motion compensation and adaptive field/frame DCT. Herein, coding methods developed on the basis of an interlaced video will hereinafter be referred to as "interlaced coding methods", and coding methods developed on the basis of a progressive video will hereinafter be referred to as "progressive coding methods".

The above interlaced coding techniques are included in the Moving Picture Experts Group Phase 2 (MPEG-2) standard which is prescribed for applications such as a digital television (TV) in International Standardization Organization/International Electrotechnical Commission Joint Technical Committee 1/Sub Committee 29/Working Group 11 (ISO/IEC JTC1/SC29/WG11) associated with digital moving video coding methods, and thus often utilized in actual application products.

On the other hand, widely used in digital moving video coders is a method wherein frames of a digital video are defined and used as three types, or I, P and B types for high-efficiency video compression and random access. Here, information for distinguishing the I, P and B frames from one another is defined as a "picture coding type". Features of these three types of frames will hereinafter be described with reference to FIG. 2, which shows an example of picture coding types and the associated predictive directions. In FIG. 2, reference directions of P frames are indicated by the upper arrows and reference directions of B frames are indicated by the lower arrows. In this example, an interval between adjacent I frames and the number of consecutive B frames may be varied according to applications or equipment.

Firstly, the coding of I frames (intra coded frames) does not refer to other frames.

Secondly, the motion compensated prediction and coding of P frames (predictive coded frames) are performed with reference to a previous I frame or a previous P frame. As a result, the coding is possible at a high compression ratio. In this case, the referred I frame or P frame is defined as a "reference frame". Between successive frames of a video, there is a high redundancy of texture information on a time axis. For this reason, a method of estimating motion information between a previous reference frame and a current P frame, performing motion compensated prediction using the estimated motion information and coding and transmitting a prediction error and the motion information is more advantageous in view of a compression rate than a method of performing the coding with no reference, like the I frame coding.

Thirdly, B frames (bidirectionally-predictive coded frames) are highest in compression rate. The prediction of the B frames is performed with reference to a next frame as well as a previous frame. Although the B frames utilize the motion compensated prediction like the P frames, they are highest in compression ratio because two reference frames are used and a more excellent one of prediction performances thereof is selected. On the other hand, the B frames do not become reference frames for other frames. In this connection, a previous frame of a current B frame is a previous I frame or P frame nearest to the current B frame in display order. Also, a next frame of the current B frame is a next I frame or P frame nearest to the current B frame in display order.

Provided that all the I, P and B frames are used for the compression-coding of a digital video, a digital order and coding order thereof will be different. For example, as shown in FIG. 2, the I, P and B frames are coded in order of I1, P1, B1, P2, B2, P3, B3, I2 and B4, whereas they are displayed in order of I1, B1, P1, B2, P2, B3, P3, B4 and I2. The second frame, B1, in the display order can be decoded and displayed in a receiver after the third frame, P1, in the display order is decoded in the receiver. In this regard, low-delay coding is required for an application with a real-time video communication function, such as a videophone. In such an application, a digital video is compression-coded and transmitted on the basis of only the I and P frames with no B frame.

The example of FIG. 2 is applied to both a progressive video and interlaced video. But, in the interlaced video, each frame is constructed by interleaving each scanning line of one of the two fields between two adjacent scanning lines of the other field as shown in FIG. 1b. Except for this fact, the video construction, predictive directions, etc. are applied in the same manner to the two types of videos.

For the compression-coding of a digital video, the motion estimation and compensation and the texture information coding are performed on the basis of a pixel group unit with a predetermined size, which is defined as a "macroblock (MB)". The most widely used size of the macroblock is generally 16 pixels/line×16 lines (referred to hereinafter as 16×16).

Macroblock-unit coding methods may generally be classified into two types, or an "intra(frame) coding" method and an "inter(frame) coding" method. The intra coding method is adapted to code input texture information included in a macroblock, and the inter coding method is adapted to predict texture information from a reference frame and code a difference between the predicted texture information and input texture information, or a prediction error. Because the coding of an I frame is performed without referring to other frames, the intra coding method is performed with respect to all macroblocks in the I frame. But, the inter coding method as well as the intra coding method are possible with respect to a P frame. As a result, any one of either the inter coding method or intra coding method is selected for a higher coding efficiency. For example, in the case where the motion estimation is erroneously performed, the prediction error may become larger. In this case, coding the larger prediction error may be lower in coding efficiency than coding the input texture information. Hence, in this case, the intra coding method is more advantageous than the inter coding method. This signifies that some macroblocks for the intra coding may be present in the P frame.

In brief, the intra coding method and inter coding method are selectively performed according to whether an signal to be coded is an input texture signal or a prediction error signal. Macroblocks for the intra coding and inter coding are together present in the P frame, whereas only macroblocks for the intra coding are present in the I frame.

Hereinafter, the macroblocks for the intra coding will be referred to as "intra macroblocks" and the macroblocks for the inter coding will be referred to as "inter macroblocks". Also, information for distinguishing the intra and inter macroblocks from each other will be defined as a "macroblock type".

On the other hand, moving video coding methods may generally be classified into a frame-based coding method which codes a rectangular frame and an object-based coding method which codes only an arbitrarily-shaped region. The object-based coding method is adapted to code and transmit only an object region to be coded, whereas the frame-based coding method is adapted to code and transmit all pixels in the frame. Because the object-based coding method is advantageous in that the user can code and transmit or manipulate only a desired object, it is anticipated to play an important part for the whole of future multimedia industry. This object-based coding method is included in the MPEG-4 standard which is prescribed in ISO/IEC JTC1/SC29/WG11. In the object-based coding method, shape information indicative of an object region is used to allow an encoder and decoder to equally make a distinction between pixels belonging to the object region and pixels belonging to a background region, among all pixels in the frame. As a result, the object-based coding method is required to code and transmit the shape information.

With reference to FIG. 3, there is a block diagram of an MPEG-4 moving video encoder established by the above international standardization organization. In the MPEG-4 standard, the term "video object plane (VOP)" is used instead of the term "frame". In the encoder, upon receiving information (texture information and shape information) regarding a desired object, a motion estimator 13 estimates macroblock-unit motion from the received information. A motion compensator 14 performs a motion compensated prediction operation for the input texture information on the basis of motion information from the motion estimator 13. A subtracter 16 detects a difference between the input texture information and motion compensated prediction texture information from the motion compensator 14. A texture coder 18 codes the texture information of the input object according to the difference detected by the subtracter 16.

An adder 17 adds the motion compensated prediction texture information from the motion compensator 14 to the texture information coded by the texture coder 18 and outputs the added result as a previous reconstructed VOP to a previous reconstructed VOP memory 15. The previous reconstructed VOP memory 15 stores the previous reconstructed VOP from the adder 17 for use in the coding of the next input object. That is, the previous reconstructed VOP stored in the previous reconstructed VOP memory 15 is applied to the motion estimator 13 and motion compensator 14 to be used for the motion estimation and motion compensation.

The MPEG-4 moving video encoder performs the intra coding and inter coding on the basis of the macroblock unit, too. To this end, although not shown in FIG. 3, the MPEG-4 moving video encoder comprises a part for determining a macroblock coding type. If the determined macroblock coding type is an intra macroblock type, the motion compensation operation is not performed, thereby allowing the input texture information to be applied directly to the texture coder 18. Also, the texture information coded by the texture coder 18 is applied directly to the previous reconstructed VOP memory 15, not via the adder 17.

On the other hand, the shape information inputted together with the texture information is coded by a shape coder 12, which then outputs a shape information bitstream and reconstructed shape information. As indicated by dotted lines in FIG. 3, the reconstructed shape information from the shape coder 12 is applied to the motion estimator 13, motion compensator 14 and texture coder 18 so that it can be used for the object-based motion estimation, the object-based motion compensation and the object-based coding of the texture information of the input object in the unit of the arbitrarily-shaped object. The MPEG-4 moving video encoder is able to perform the frame-based coding as well as the object-based coding. The coding and transmission of shape information are not required in the frame-based coding. To this end, switches are used to turn on/off the operation of the shape coder 12 and signals therefrom, as shown in FIG. 3. In FIG. 3, a signal, shape_coding_flag, is applied to control the switches.

A motion information bitstream, estimated and coded by the motion estimator 13, a texture information bitstream, coded by the texture coder 18 and a shape information bitstream, coded by the shape coder 12 are multiplexed by a multiplexer 19 and then buffered by a buffer 20. Finally, a multiplexed bitstream is transmitted to a decoder through a transmission medium. Although not shown in FIG. 3, VOP-unit overhead information is coded and applied to the multiplexer 19 so that it can be multiplexed together with the other bitstreams and then transmitted to the decoder. The VOP-unit overhead information will be mentioned later in more detail.

The VOP defined in the MPEG-4 standard corresponds to the frame defined in the existing standard and is thus classified into three VOP coding types, or I, P and B VOP types, in a similar manner to the frame. The VOP has the same characteristics (for example, motion compensated prediction directions) as those of the rectangular frame, with the exception that it has arbitrary shape information differently from the rectangle.

As stated above, for the digital video compression-coding, the motion estimation and compensation and the texture information coding are performed on the basis of the macroblock unit, which is a pixel group with a predetermined size. For the coding of an object with arbitrary shape information, macroblocks may be classified into three types in association with the shape information. The first type of macroblock is present beyond an object region. This macroblock contains no object element therein and thus does not require the coding and transmission. Hereinafter, the first type of macroblock will be referred to as a "transparent macroblock". The second type of macroblock is entirely included within the object region. Techniques developed for the existing frame-based coding are applicable directly to the second type of macroblock. Hereinafter, the second type of macroblock will be referred to as an "opaque macroblock". The third type of macroblock is present both within the object region and a non-object region, and it will hereinafter be referred to as a "boundary macroblock". In order to allow the receiver to decode such macroblocks, the transmitter must code and transmit the shape information indicative of the object region and the texture information in the object region. Of course, in the case of macroblocks subjected to the motion estimation and compensation like the inter macroblocks in the P and B frames, the motion information must further be coded and transmitted.

FIG. 4 shows an example of transparent macroblocks (TMBs), opaque macroblocks (OMBs) and boundary macroblocks (BMBs). In this drawing, a slashed part represents an object region to be coded and small tetragons represent macroblocks, respectively. In this example, the macroblocks, TMBs, present beyond the object region are six in number, the macroblocks, OMBs, present within the object region are twelve in number and the macroblocks, BMBS, present both within and beyond the object region are twenty-two in number.

On the other hand, research has actively been done for improving a coding efficiency of an interlaced video with different signal characteristics from a progressive video. Examples of interlaced coding techniques are shown in the MPEG-4 Final Draft of International Standard (FDIS) and the representative two thereof may be adaptive field/frame DCT and field-based motion information estimation/prediction, which will hereinafter be described briefly.

A description will first be given of the adaptive field/frame DCT technique.

A 16×16 macroblock is partitioned into four blocks each of which has an 8×8 size and the discrete cosine transform (DCT) operation is performed for each of the four blocks. FIG. 5 shows the relation between one macroblock and four partitioned blocks. The DCT operation is performed with respect to an original texture signal in an intra macroblock and with respect to a motion compensated prediction error signal in an inter macroblock, respectively. This DCT operation becomes higher in efficiency as adjacent pixels become higher in correlation.

In the interlaced video, a correlation between adjacent pixels in the same field may be higher than that between pixels on adjacent lines because the pixels in the same field are obtained at the same time. This is the largest feature of the interlaced video for distinguishing it from the progressive video. Such a feature of the interlaced video becomes more conspicuous as the motion of an object or objects in the video becomes larger in scale. In this case, it is preferred to perform the DCT operation with respect to pixels in the same field. In this regard, in the interlaced video, there are allowed both DCT for pixels in the same field and typical DCT considering no field and any one thereof is selected and coded for a higher compression efficiency. A flag indicative of the selected DCT is transmitted to the receiver. This technique is defined as "adaptive field/frame DCT". Hereinafter, the DCT for pixels in the same field will be referred to as "field DCT" and the DCT considering no field will be referred to as "frame DCT". Also, the flag indicative of the selected DCT will be denoted as dct_type.

Now, a detailed description will be given of the adaptive field/frame DCT technique.

First, compare a correlation between a specific line and a line adjacent thereto with that between the specific line and a line subsequent to the adjacent line. The frame DCT operation is performed if the correlation between the specific line and adjacent line is higher than that between the specific line and subsequent line, and the field DCT operation is performed if the correlation between the specific line and adjacent line is lower than that between the specific line and subsequent line. The correlation comparison can be performed on the basis of the following equation:

$$\sum_{i=0}^{6}\sum_{j=0}^{15}(p_{2i,j}\ p_{2i+1,j})^2(p_{2i+1,j}\ p_{2i+2,j})^2 >$$

$$\sum_{i=0}^{6}\sum_{j=0}^{15}(p_{2i,j}\ p_{2i+2,j})^2(p_{2i+1,j}\ p_{2i+3,j})^2$$

In the above equation, i and j represent positions of a pixel in a macroblock (MB) on vertical and horizontal axes, respectively, and $P_{i,j}$ represents a texture value of a pixel at i and j positions. If the left of the inequality is larger than the right member as in the above equation, this signifies that the correlation between pixels in the same field is higher. In this case, a shuffling step is performed which shuffles line positions to collect lines in the top field and lines in the bottom field in separate groups, respectively, so as to change the arrangement of FIG. 6a to that of FIG. 6b. Thereafter, each macroblock in the arrangement of FIG. 6b is partitioned into four blocks as shown in FIG. 5 and the DCT (field DCT) operation is performed for each of the four blocks. In the case where the right member is larger than or equal to the left member, this signifies that the correlation between the adjacent lines is higher. In this case, under the condition that the shuffling step is not performed, each macroblock in the arrangement of FIG. 6a is partitioned into four blocks as shown in FIG. 5 and the DCT (frame DCT) operation is performed for each of the four blocks.

In the adaptive field/frame DCT technique, the flag dct_type is used to indicate whether DCT for a macroblock is the frame DCT or field DCT. The flag dct_type is composed of one bit and transmitted to the receiver. The decoder in the receiver decodes the flag dct_type from a received bitstream. The decoder also decodes DCT coefficients of four blocks and performs an inverse DCT operation with respect to the decoded DCT coefficients. Then, the decoder determines according to the flag dct_type whether DCT for the current macroblock is the field DCT or frame DCT. If the DCT for the current macroblock is the field DCT, the decoder performs an inverse shuffling operation for the current macroblock to change the arrangement of FIG. 6b to that of FIG. 6a. As a result, the decoder obtains the final macroblock.

Next, a description will be given of the field-based motion information estimation technique, which is applied to a P frame.

The existing, most general motion information estimation method is to estimate motion information from a reference frame on the basis of a macroblock unit and perform motion compensated prediction from a reconstructed signal of the reference frame using the estimated motion information. In this case, it is assumed that all pixels in one macroblock have the same motion information. This makes it possible to transmit one motion information per macroblock to the receiver (four motion information per macroblock may be transmitted to the receiver as will be mentioned later).

The above assumption is applicable to the progressive video, but not to the interlaced video. In other words, in the interlaced video, because the top and bottom fields are different in frame generation time as stated previously, the assumption that pixels in the same field have the same motion information is more accurate rather than the assumption that all pixels in one macroblock have the same motion information. As a result, in the interlaced video, it is more accurate to estimate motion information of each field. Also, a coding gain can be obtained by reducing a motion compensated prediction error. Noticeably, two motion information per macroblock must be transmitted. For this reason, it is necessary to compare the frame-based motion information estimation and field-based motion information estimation with each other to select a more advantageous one thereof. Further, an information flag, field_prediction, indicative of the selected motion information estimation is composed of one bit and transmitted to the receiver.

Noticeably, motion compensation for the top field of the current frame is possible from both the top and bottom fields of the previous frame as shown in FIG. 7. As a result, an information flag, prediction_direction, indicative of a prediction direction must be transmitted together. This operation is performed similarly with respect to the bottom field of the current frame.

In brief, the following five types of information per macroblock should be transmitted to the receiver for the field-based motion information estimation and prediction:

1) field_prediction
2) prediction_direction of top field
3) prediction_direction of bottom field
4) motion information of top field
5) motion information of bottom field The decoder in the receiver decodes the field_direction information from a received bitstream. In the case where the field-based motion compensated prediction is determined according to the field_direction information, the decoder decodes the 2) to 5) information from the received bitstream and performs the associated decoding process.

Although the field-based motion information estimation technique has been described to be applied to the P frame, it is applicable to a B frame in a similar manner. However, because the present invention is not directly concerned with the coding and decoding of the B frame, a description of the field-based motion information estimation technique associated with the B frame will be omitted.

On the other hand, a bit stream produced by compression-coding a digital video signal may be transmitted through a channel in which a transmission error may often occur, such as a mobile communication channel. In this case, when a received bitstream is decoded by the receiver, a reconstructed picture may be considerably damaged in quality due to the transmission error. Research has actively been done for minimizing problems resulting from the transmission error, and the resultant representative techniques may be error detection, error localization and data recovery, which are commonly called "error resilient techniques". Also, a bitstream structure reflecting such techniques is called an "error resilient bitstream".

Such error resilient techniques are shown in the MPEG-4 FDIS including the VOP-unit coding and will hereinafter be described briefly. These techniques are applicable to both the object-based coding with arbitrary shape information and the frame-based coding.

The first error resilient coding technique is a resynchronization method. A resynchronization marker, resync marker, enables resynchronization between a bitstream after error detection and the decoder. In the case where an error occurs on a bitstream, bitstreams between a resynchronization point just before the error occurrence and a resynchronization point just after the error occurrence are generally neglected. Provided that the resynchronization method is able to effectively localize or minimize the amount of data to be neglected in the decoder, other techniques (for example, data recovery and error concealment) associated with the error resilience can be enhanced in performance.

A resynchronization method of MPEG-4 adopts a structure analogous to a group of blocks (GOB) structure used in H.261 or H.263 which is the moving video coding standard of ITU-T. In these standards, the GOB is composed of at least one macroblock row. When a new GOB is started in the coding procedure, a GOB header is positioned on a bitstream. The GOB header includes a GOB start code for notifying the decoder of the position of the GOB. In addition to the GOB start code, the GOB header includes information necessary to resuming the decoding procedure. This GOB method is a spatial resynchronization method. In other words, when the coding procedure reaches the position of a specific macroblock, a resynchronization signal, or resync marker, is inserted into a bitstream. However, the GOB method has a disadvantage in that resynchronization signals cannot be positioned on bitstreams at regular intervals when the coding procedure is performed at a variable bit-rate.

In order to avoid such a problem, the MPEG-4 resynchronization method is adapted to periodically insert resynchronization signals into bitstreams. To this end, a video packet, or a group of bit streams between resynchronization signals, is provided on the basis of the number of bits included therein instead of the number of macroblocks. If, after the coding of one macroblock is ended, the number of bits accumulated in a given video packet exceeds a predetermined threshold value, a new video packet is started from the next macroblock.

FIG. 8 shows an example of an error resilient bitstream structure using a resynchronization signal. A bitstream of MPEG-4 is sequentially composed of a video packet header and a video packet. The video packet header includes a resync marker, macroblock number, quantization scale and header extension code (HEC). The video packet includes actual macroblock data. The resynchronization signal indicates the start of a new video packet. To this end, the resynchronization signal must be distinguished from all possible VLC codes and other start codes such as VOP start code. Header information including the resynchronization signal is positioned at the start of a video packet. The header information is essential in, after an error occurs in a video packet, resuming the decoding procedure beginning with the position of a resynchronization signal nearest to the error occurrence position. Also, the header information includes information such as a macroblock number indicative of the position of a first macroblock in a given video packet and a quantization parameter (quantization scale).

The video packet header may include a "header extension code (HEC)" which is VOP-unit overhead information. In the case where VOP-unit information is damaged due to a transmission error, the decoding operation can be performed on the basis of the VOP-unit overhead information in the video packet header. The representative overhead information may be information VOP_coding_type, intra_dc_vlc_thr, VOP_fcode_forward and VOP_fcode_backward. The VOP_coding_type information indicates which one of I, P and BVOPs is to be now coded. The intra_dc_vlc_thr information indicates whether a VLC table of AC information is used for the coding of DC information. The VOP_fcode_forward information indicates a search range for forward motion estimation, and the VOP_fcode_backward information indicates a search range for backward motion estimation in the B VOP. Such information included in the header extension code is essential in allowing the decoder to decode video packets independently.

Some compression-coding methods should be modified for the use of an error resilient coding method in the MPEG-4. For example, all predictive codingmethods must limit information to be used for predictions, to information in the same video packet to prevent error propagation. In other words, for predictions (for example, AC/DC prediction and motion vector prediction), a video packet boundary must be considered to be the same as a VOP boundary.

The second error resilient coding technique is a data partitioning method. The performance of an error concealment method essential to a video decoder strong against a transmission error is very dependent on the resynchronization method. If the resynchronization method localizes the transmission error more considerably, the error concealment method becomes higher in performance. The MPEG-4 standard has recognized the necessity of an enhanced error localization method and thus developed a new technique called data partitioning. For a P VOP, the data partitioning method is adapted to partition information of all macroblocks in a video packet on the basis of texture information and motion information and insert a second resynchronization signal between the motion information and the texture information. In this case, overhead information is transmitted to the receiver to notify the decoder of the fact that the data partitioning method is used. For distinction from the existing resynchronization signal, the second resynchronization signal for the data partitioning is denoted as motion_marker.

FIG. 9 shows an example of an error resilient bitstream structure to which the data partitioning method is applied. As shown in this drawing, in the data partitioning method, the macroblock data of FIG. 8 is partitioned into motion and overhead information and texture information via a motion marker. The accurate decoding of the motion marker signifies that motion information of all macroblocks in a given video packet and the associated overhead information have accurately been decoded. Upon detecting the presence of a transmission error in a texture information bitstream to be next transmitted and decoded, the decoder neglects all texture information in a given video packet and performs motion compensated prediction from a reference VOP, previously decoded and stored in a memory, using only decoded motion information prior to a motion marker to reconstruct all macroblocks in the given video packet. On the other hand, DC information is important information in an I VOP, whereas motion information is important information in a P VOP. As a result, information of all macroblocks in a video packet are partitioned on the basis of the DC information and AC information and a resynchronization signal is inserted between the DC information and AC information. For the I VOP, motion information is not considered because motion information estimation and compensation are not performed. If the AC information is subjected to the occurrence of a transmission error, it is neglected and only the DC information is used to reconstruct all macroblocks in a given video packet. In this case, the inserted resynchronization signal is denoted as "dc_marker".

As mentioned above, the data partitioning method is advantageous in that it can reduce the amount of information to be neglected upon the occurrence of a transmission error. In the case of FIG. 8 to which the data partitioning method is not applied, all information in one video packet are discarded if a transmission error is detected from the video packet. Then, a resynchronization signal following the occurrence of the transmission error is detected and the decoding operation is resumed from that time. But, as stated above, in the case where the data partitioning method is applied to the P VOP, when a transmission error occurs in texture information, motion information is not neglected, but used for the reconstruction of a video signal. Also, in the case where the data partitioning method is applied to the I VOP, when a transmission error occurs in AC information, DC information is not neglected, but used for the reconstruction of a video signal.

The resynchronization method and data partitioning method have been described until now.

The third error resilient technique is a reversible variable length code (referred to hereinafter as RVLC) method. In the RVLC method, a coding table is designed to enable the decoding operation bidirectionally, or in the forward direction and reverse direction. The reverse decoding operation is performed beginning with the position of a resynchronization signal just after an error occurrence point with respect to a bitstream for which the forward decoding operation is impossible due to the presence of an error. As a result, the RVLC method can reduce the number of bits to be neglected in the decoder because of a transmission error. In the MPEG-4 standard, the RVLC method is now applied to only the coding of DCT coefficients.

Among the error resilient techniques as stated above, the data partitioning method is difficult to apply to a conventional interlaced coding method. The conventional interlaced coding method has been developed on the assumption that it is applied to an environment with little transmission error, such as a digital TV. For this reason, the error resilient techniques have not been necessary to the interlaced coding method. However, in the case where the coding and transmission of an interlaced moving video is required to be applied to a mobile communication or mobile broadcasting environment in which a transmission error often occurs, the interlaced coding method has a disadvantage in that picture quality is considerably degraded due to the transmission error.

For a better understanding of the above problem, a conventional video packet coding method will hereinafter be described in more detail under the condition that it is applied respectively to an intra picture (I frame) and an inter picture (P frame or B frame).

FIG. 10 is a flowchart illustrating a conventional video packet coding method for an intra picture. Assuming that the number of macroblocks in one video packet is $N_{MB}$, all shape information of the $N_{MB}$ macroblocks, DC information and overhead information for the decoding of the DC information are first transmitted. In the case where a given macroblock is a transparent macroblock with no object pixel, there is no necessity for transmitting the DC information and the overhead information for the decoding of the DC information. And then, dc_marker information, AC information of the $N_{MB}$ macroblocks and overhead information for the decoding of the AC information are transmitted. The dc_marker information is a signal for distinguishing the DC information and the AC information from each other. Hence, the dc_marker signal should be distinguished from all possible codes in the encoder.

The above-mentioned conventional intra picture video packet coding method may cause numerous problems when it is applied to the coding of an interlaced intra picture. For example, for the coding of an interlaced video, a field DCT operation must be performed and the associated information, dct_type, should be transmitted. However, the conventional intra picture video packet coding method does not consider the transmission of such information at all. For this reason, in the case where the interlaced intra picture is transmitted according to the conventional video packet coding method, it cannot be appropriately reconstructed in the decoder due to information insufficiency. In other words, the decoder cannot determine which one of the methods of FIGS. 6a and 6b will be applied after DC reconstruction.

FIG. 11 is a flowchart illustrating a conventional video packet coding method for an inter picture. Assuming that the number of macroblocks in one video packet is $N_{MB}$, all shape information of the $N_{MB}$ macroblocks, motion information and overhead information for the decoding of the motion information are first transmitted. Then, motion_marker information, texture information of the $N_{MB}$ macroblocks and overhead information for the decoding of the texture information are transmitted. The motion_marker information is a signal for distinguishing the motion information and the texture information from each other. Hence, the motion_marker signal should be distinguished from all possible codes in the encoder.

The overhead information for the decoding of the motion information may be a flag indicating that no bit to be coded is present in a given macroblock, and information indicative of a motion information transmission mode (in a progressive video, there is a mode for transmitting one motion information per macroblock and a mode for transmitting four motion information per macroblock). The overhead information for the decoding of the texture information may be information indicating whether a texture coefficient to be transmitted is present in a given block, and a flag indicating whether a texture information AC coefficient is to be predictive-coded.

The above-mentioned conventional inter picture video packet coding method may have numerous problems when it is applied to the coding of an interlaced inter picture. For example, although there is no necessity for distinguishing fields from each other for the coding of a progressive inter picture, it is necessary to make a distinction between the fields for the coding of an interlaced video. In this connection, in the case where the conventional inter picture video packet coding method is applied directly to the coding of an interlaced moving video, the decoder cannot properly cope with the occurrence of a transmission error.

SUMMARY OF THE INVENTION

Therefore, the present invention has been made in view of the above problems, and it is an object of the present invention to provide a method for coding a digital interlaced moving video, in which, even when the compression-coded, interlaced moving video is transmitted through a channel where a transmission error may often occur, such as a mobile communication channel, a decoder can perform an error concealment operation of high performance to reconstruct a moving picture of high quality.

In accordance with the present invention, the above and other objects can be accomplished by a provision of a method for coding a digital interlaced moving video, comprising the first step of transmitting picture-unit overhead information; the second step of determining whether a video packet to be coded is a first packet of a given picture; the third step of transmitting a video packet header including overhead information for an interlaced decoding operation if it is determined at the second step that the video packet is not the first packet of the given picture; the fourth step of determining whether the given picture is an intra picture, if it is determined at the second step that the video packet is the first packet of the given picture or after the video packet header is transmitted at the third step; the fifth step of coding and transmitting the video packet in an interlaced intra picture manner if it is determined at the fourth step that the given picture is the intra picture; the sixth step of coding and transmitting the video packet in an interlaced inter picture manner if it is determined at the fourth step that the given picture is not the intra picture; and the seventh step of determining whether the video packet is a last packet of the given picture, after it is coded and transmitted at the fifth or sixth step, returning to the second step if the video packet is not the last packet of the given picture and ending a digital interlaced coding operation if the video packet is the last packet of the given picture.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 12:
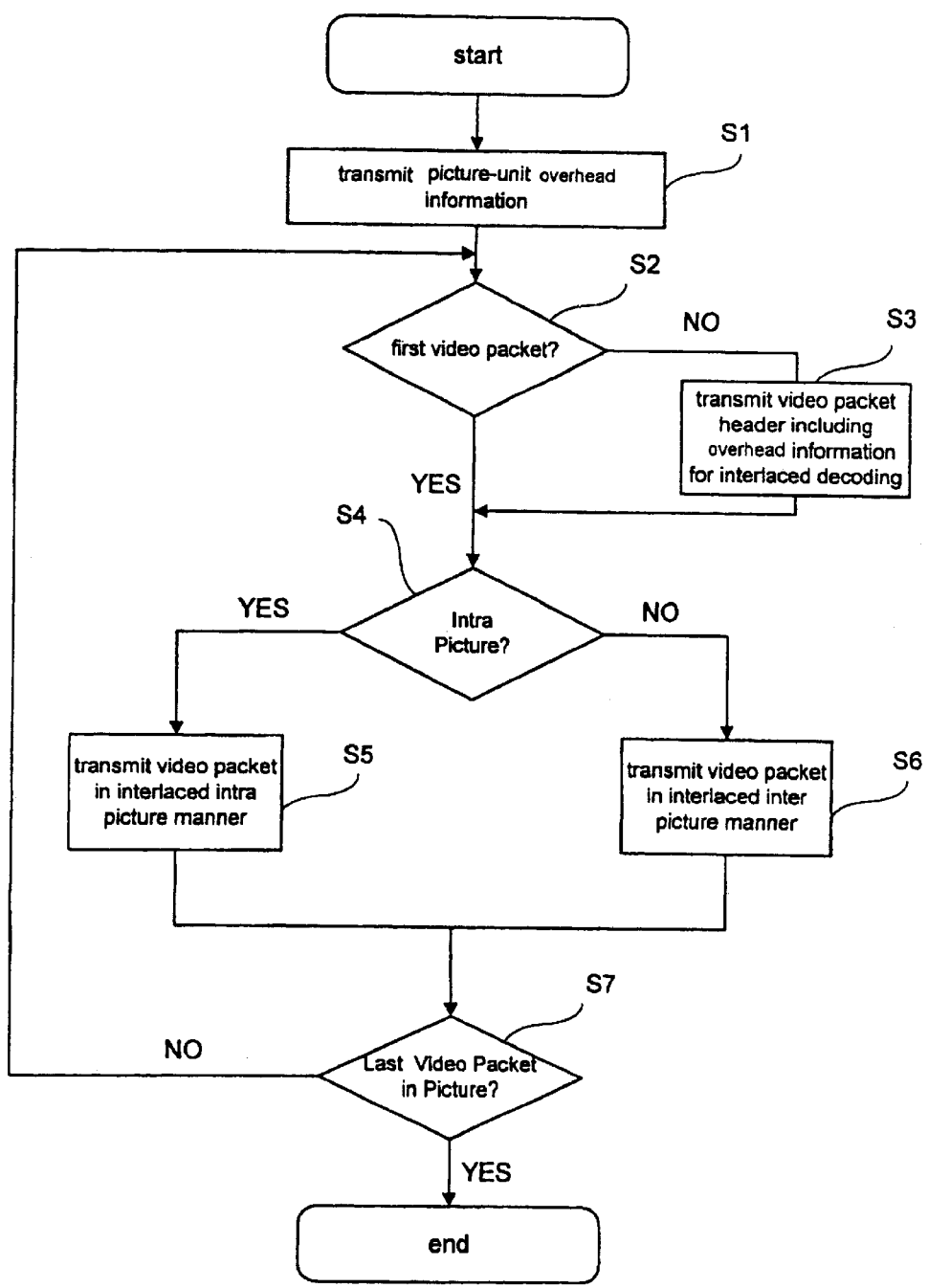
FIG. 12 is a flowchart illustrating a picture-based coding method for an interlaced moving video in accordance with the present invention.

FIG. 12 is a flowchart illustrating a data partitioning coding method for coding intra and inter pictures of an interlaced moving video on the basis of a video packet unit, respectively, in accordance with the present invention.

Now, a method for coding a digital interlaced moving video in accordance with the present invention will be mentioned in detail with reference to FIG. 12. A picture coding operation is started upon receiving one picture of the interlaced moving video to be coded. To this end, picture-unit overhead information for the picture coding operation is transmitted at the first step S1. The picture-unit overhead information may be somewhat different according to the associated standards or applications, but it is not especially limited in the present invention. For example, in the MPEG-4 standard, the picture-unit overhead information may be picture coding type information, vop_coded and vop_rounding_type, and quantization scale information. But, in the present invention, the picture-unit overhead information must essentially include picture coding type information indicative of whether a given picture to be coded is an inter picture or an intra picture, and parameters for an interlaced decoding operation, top_field_first and alternate_vertical_scan_flag. Here, the parameter, top_field_first, is information indicative of which one of top and bottom fields is earlier in time than the other, and the parameter, alternate_vertical_scan_flag, is information indicative of a method for scanning DCT coefficients after DCT.

The third step S3 is performed to transmit a video packet header including overhead information for the interlaced decoding operation, preceding the associated video packet. Noticeably, because a first video packet of each picture follows the overhead information transmitted at the first step S1, transmission of video packet header of the first video packet is not necessary. This processing is controlled by the second step S2. Namely, the second step S2 is performed to determine whether a video packet to be coded is a first packet of a given picture and control the third step S3 in accordance with the determined result. If it is determined at the second step S2 that the video packet to be coded is not the first packet of the given picture, the video packet header is transmitted at the third step S3. The video packet header includes picture-unit interlaced overhead information to be used when the picture-unit overhead information transmitted at the first step S1 is damaged due to a transmission error. Similarly to the picture-unit overhead information at the first step S1, the picture-unit interlaced overhead information at the third step S3 is not especially limited in the present invention. But, in the present invention, the picture-unit interlaced overhead information must essentially include picture coding type information indicative of whether a given picture to be coded is an inter picture or an intra picture, and parameters for the interlaced decoding operation, top_field_first and alternate_vertical_scan_flag.

The fourth step S4 is performed to determine whether the given picture is an intra picture or an inter picture and control the fifth and sixth steps S5 and S6 in accordance with the determined result. If the given picture is the intra picture at the fourth step S4, the video packet to be coded is coded and transmitted in an interlaced intra picture manner at the fifth step S5. However, in the case where the given picture is the inter picture at the fourth step S4, the video packet to be coded is coded and transmitted in an interlaced inter picture manner at the sixth step S6. In other words, because the intra picture and inter picture have different important information, video packets thereof should be coded and transmitted in different manners.

The seventh step S7 is performed to determine whether the video packet coded and transmitted at the fifth or sixth step S5 or S6 is a last packet of the given picture. If the coded and transmitted video packet is not the last packet of the given picture at the seventh step S7, the interlaced coding operation returns to the second step S2 to process a new packet of the given packet. In the case where the coded and transmitted video packet is the last packet of the given picture at the seventh step S7, the interlaced coding operation is ended.

Figure 13:
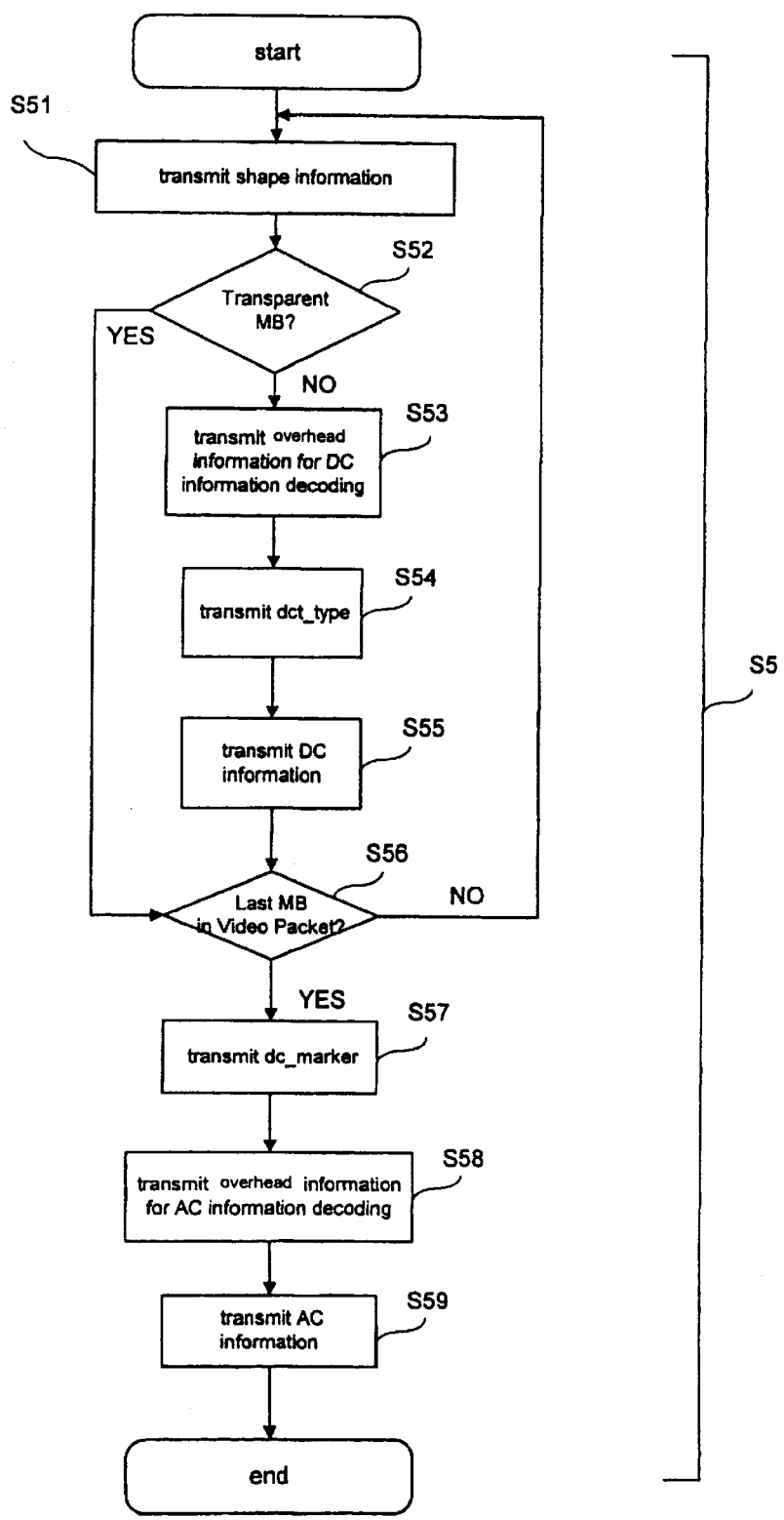
FIG. 13 is a flowchart illustrating a video packet coding method for an interlaced intra picture in accordance with the present invention.

FIG. 13 is a flowchart illustrating a video packet coding method for an interlaced intra picture in accordance with the present invention. The fifth step S5 in FIG. 12 of coding and transmitting the video packet in the interlaced intra picture manner will hereinafter be described in more detail with reference to FIG. 13.

First, shape information of a given macroblock in the video packet to the coded is coded and the resultant shape information bitstream is transmitted to a decoder at step S51. It is determined at step S52 whether the given macroblock is a transparent macroblock with no object pixel. If the given macroblock is the transparent macroblock at step S52, the interlaced intra picture coding operation proceeds to step S56 because no further information to be transmitted is present. Noticeably, the present invention is applicable to a frame-based coding method as well as an object-based coding method. In the frame-based coding method, the shape information need not be transmitted and the shape information transmission step S51 and transparent macroblock determination step S52 are thus omitted.

If it is determined at the above step S52 that the given macroblock is not the transparent macroblock, overhead information for the decoding of DC information of the given macroblock is transmitted at step S53. The overhead information may preferably include macroblock type information and quantization scale information. It should be noted that the overhead information is not especially limited in the present invention so far as it is transmitted to the decoder.

After the overhead information for the DC information decoding is transmitted at the above step S53, a flag, dct_type, is transmitted at step S54 to indicate whether a block-unit DCT mode of the given macroblock is a frame mode or a field mode. The decoder checks the transmitted flag dct_type and performs a inverse quantization operation and inverse DCT operation. Using the DCT type, the decoder can determine whether a shuffling operation was performed after the inverse DCT. Then, the DC information of the given macroblock is transmitted at step S55. It is determined at step S56 whether the given macroblock is a last macroblock in the video packet to be coded. If the given macroblock is the last macroblock in the video packet to be coded, the interlaced intra picture coding operation proceeds to step S57. However, in the case where it is determined at step S56 that the given macroblock is not the last macroblock in the video packet to be coded, the interlaced intra picture coding operation returns to the above step S51 to process a new macroblock in the video packet to be coded.

In the present invention, the last macroblock determination step S56 may be performed in various manners. For example, the length of each video packet can be set to a predetermined number of macroblocks (see a GOB structure in H.263) or a given video packet can be determined to be ended if the number of bits accumulated in the given video packet exceeds a predetermined threshold value (see MPEG-4). In the present invention, the last macroblock determination step S56 is not limited to a specific manner.

If the given macroblock is determined to be the last macroblock in the video packet at the above step S56, a marker signal, dc_marker, is transmitted at step S57 to make a distinction between DC information and AC information of all macroblocks in the video packet. It is preferred that the marker signal dc_marker should be distinguished from all possible codes in a moving video coding system to which the interlaced intra picture coding operation of FIG. 13 is applied. For example, in the MPEG-4 standard, a bitstream of "110 1011 0000 0000 0001" may be used as the marker signal dc_marker.

Then, overhead information for the decoding of the AC information of all the macroblocks in the video packet to be coded is transmitted at step S58. The overhead information for the AC information decoding may preferably include coded block pattern information indicative of whether an AC coefficient to be transmitted is present in each block of each of the macroblocks in the video packet, and a signal, ac_pred_flag, indicative of whether the AC information has been predictive-coded. Finally, the AC information of all the macroblocks in the video packet to be coded is transmitted at step S59.

In FIG. 13, each of the above steps S58 and S59 has been shown to transmit the overhead information or AC information of all the macroblocks in the video packet at the same time. Alternatively, the above steps S58 and S59 may be performed with respect to each of the macroblocks in the video packet, sequentially from the first macroblock to the last macroblock.

The above step S54 of the intra picture video packet coding method in FIG. 13 is the kernel of the present invention. If the marker signal dc_marker transmitted at step S57 is accurately decoded and the presence of a channel error is detected in the subsequently transmitted AC information, the AC information is neglected and the coded video packet is reconstructed on the basis of only the DC information preceding the marker signal dc_marker. At this time, unless the flag dct_type has been transmitted, the decoder cannot determine whether the block-unit DCT mode of the given macroblock is the frame mode or the field mode, thereby increasing the degradation in picture quality.

Figure 1A:
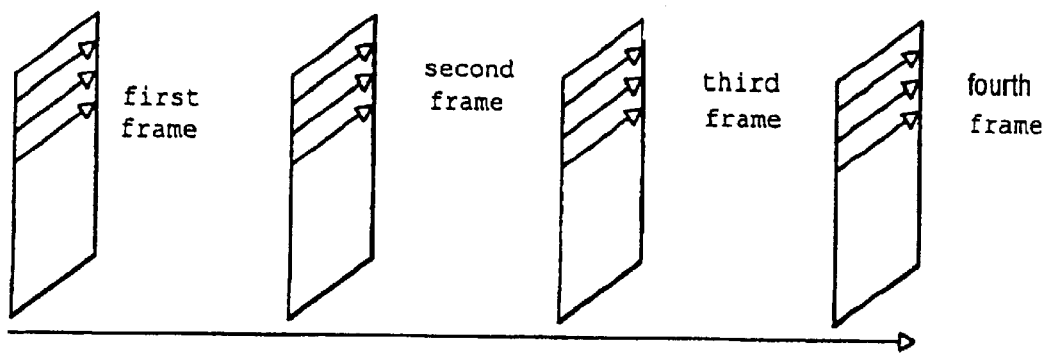
FIGS. 1a and 1b are views showing transmission flows of a progressive video a nd interlaced video on a time axis, respectively.
Figure 1B:
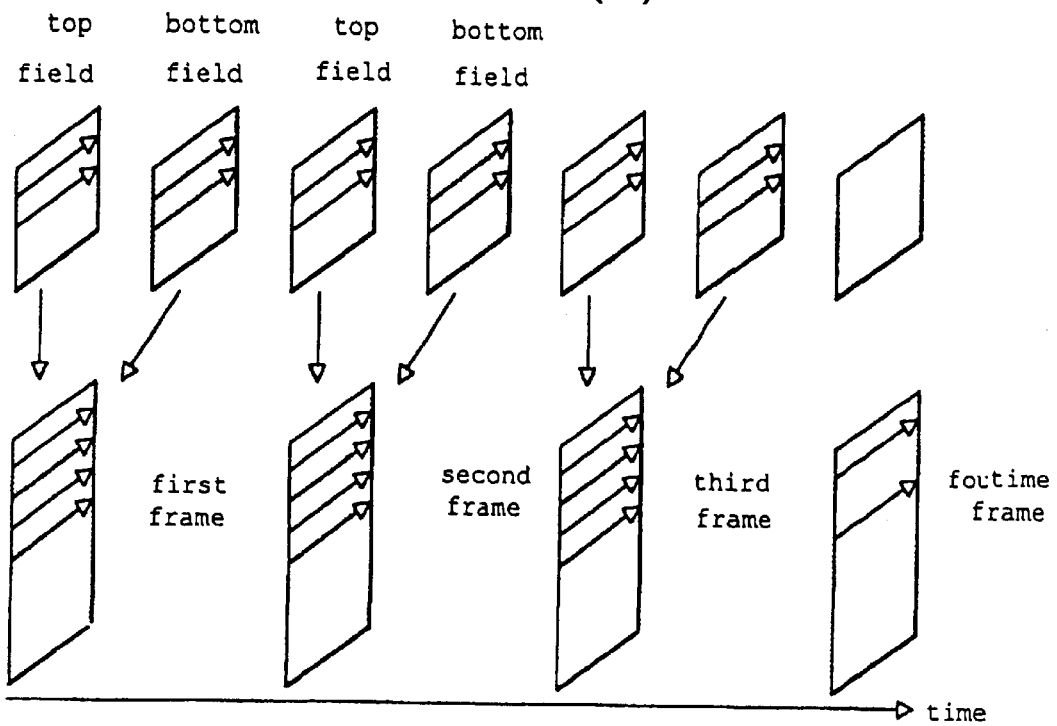
Figure 2:
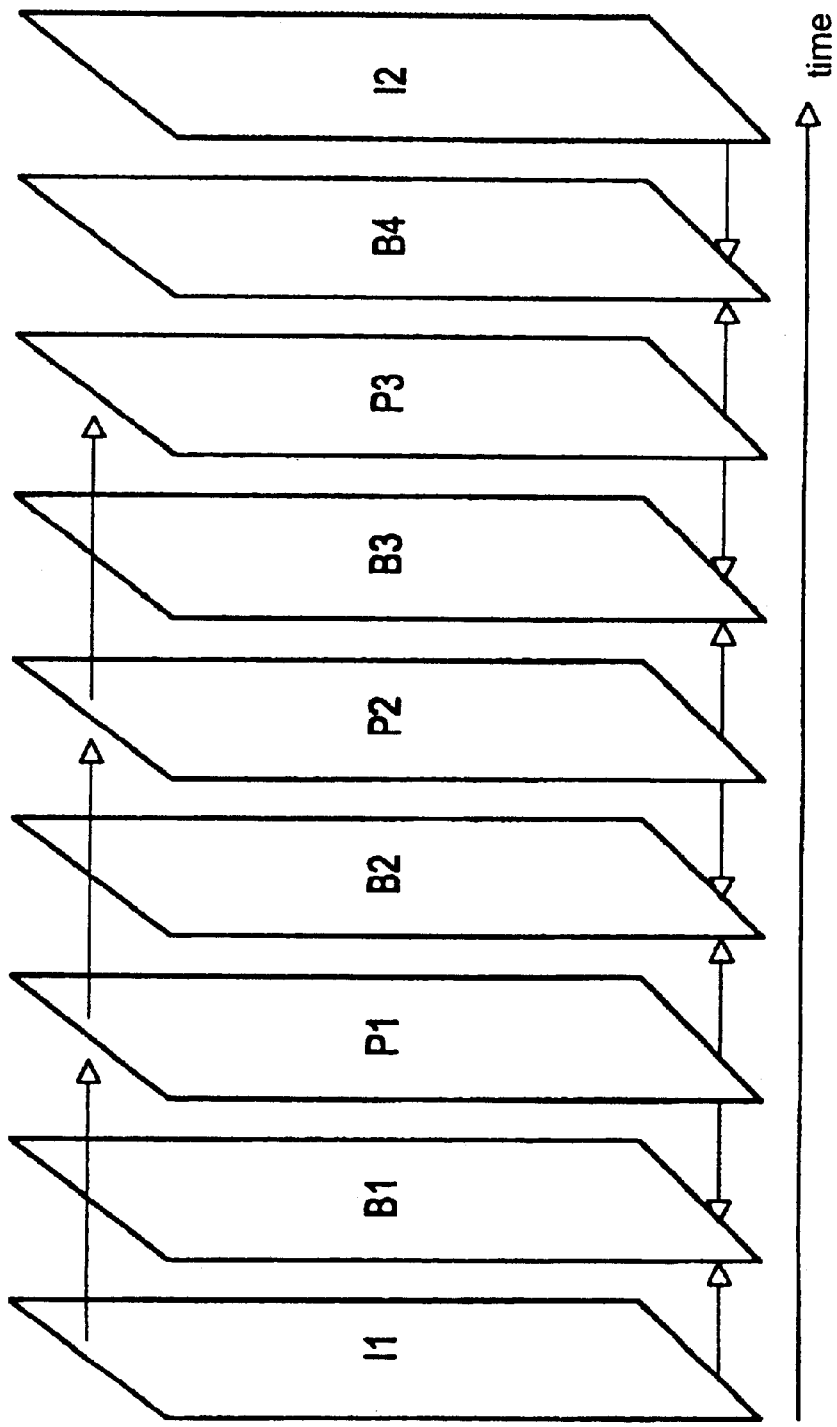
FIG. 2 is a view showing an example of picture (frame) coding types (I, P and B frame types) and the associated prediction directions.
Figure 3:
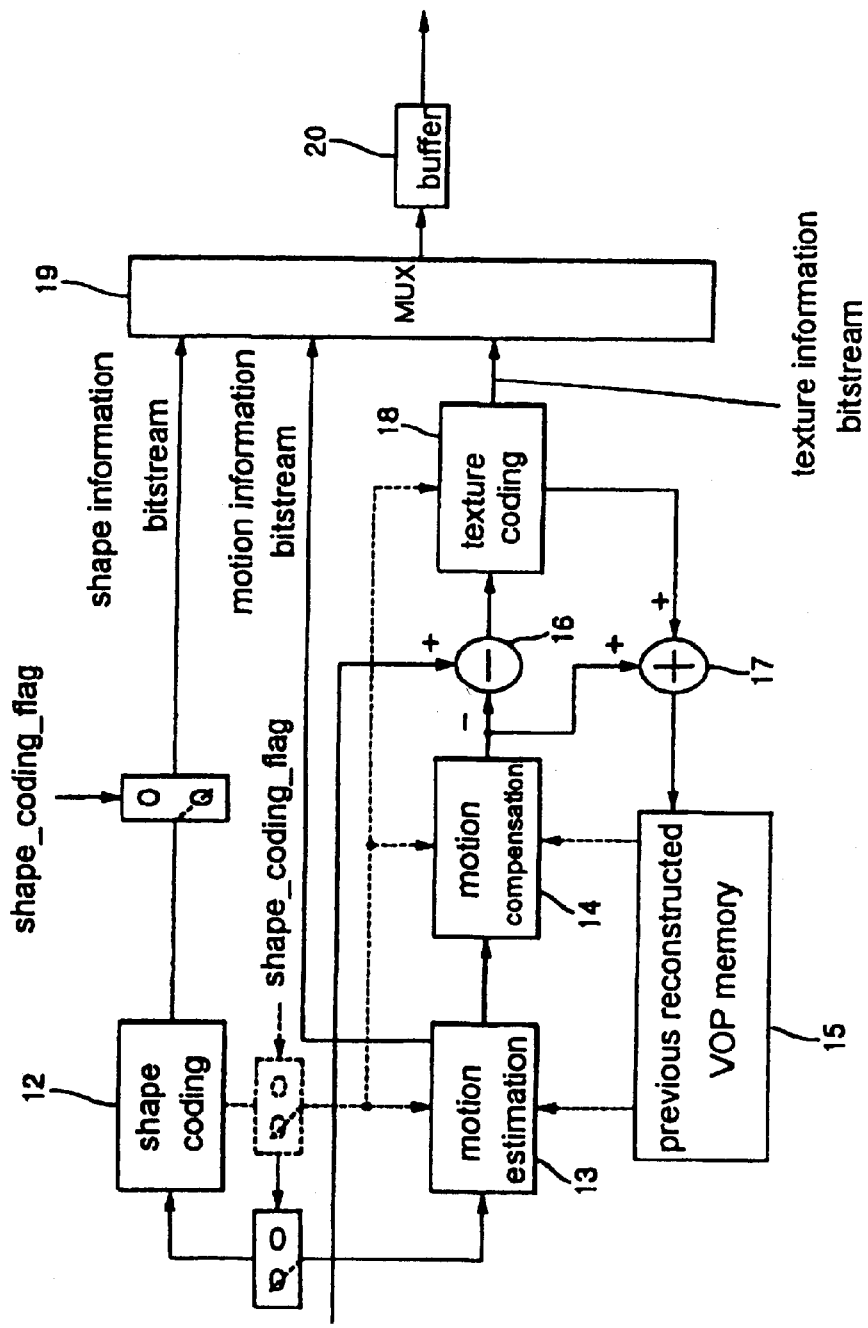
FIG. 3 is a block diagram of an MPEG-4 moving video encoder established by an international standardization organization.
Figure 4:
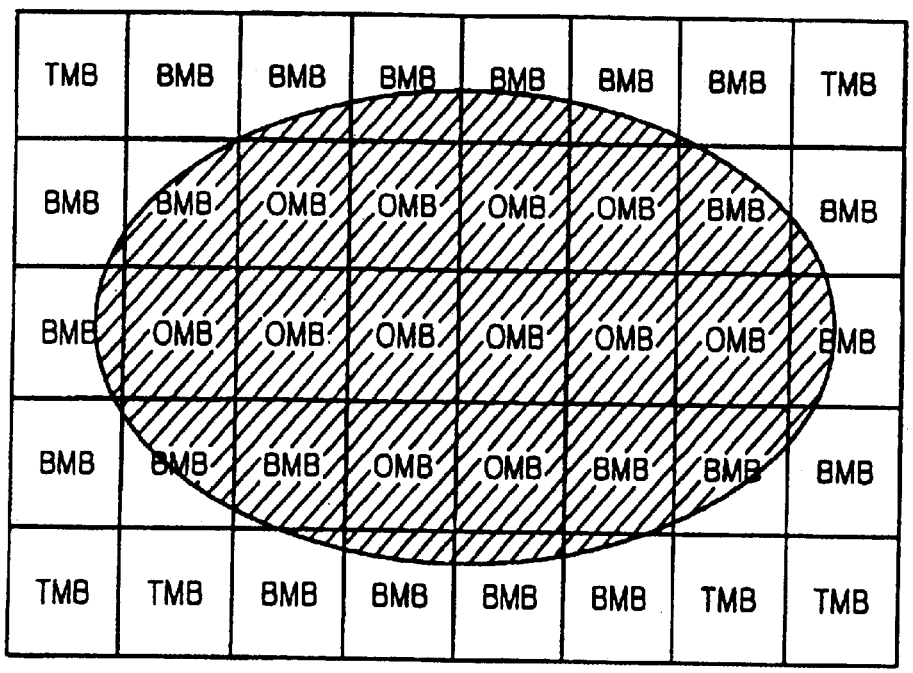
FIG. 4 is a view showing an example of transparent macroblocks (TMBs), opaque macroblocks (OMBs) and boundary macroblocks (BMBs)
Figure 5:
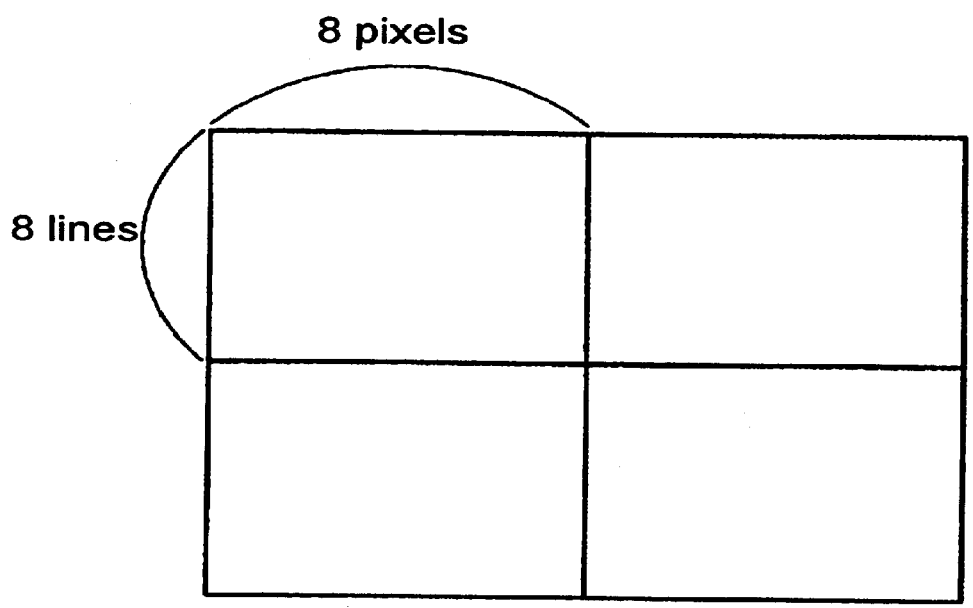
FIG. 5 is a view showing the relation between one macroblock and four partitioned blocks.
Figure 6:
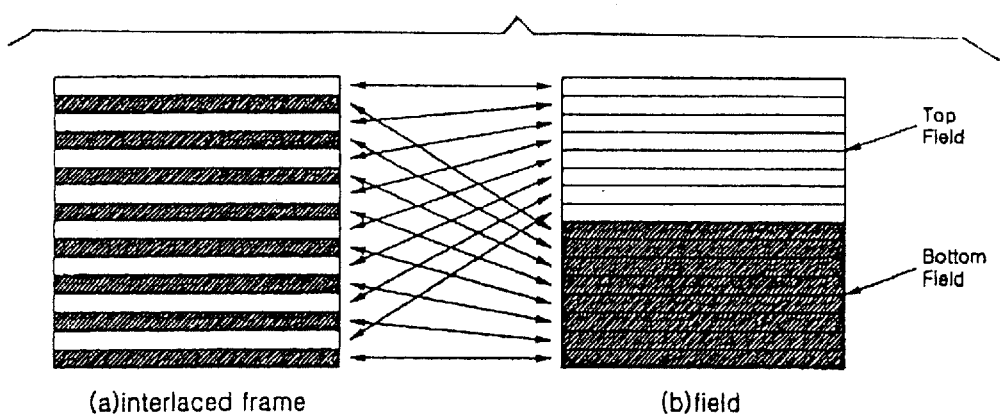
FIGS. 6a and 6b are views showing macroblocks for frame mode and field mode DCT, respectively.
Figure 7:
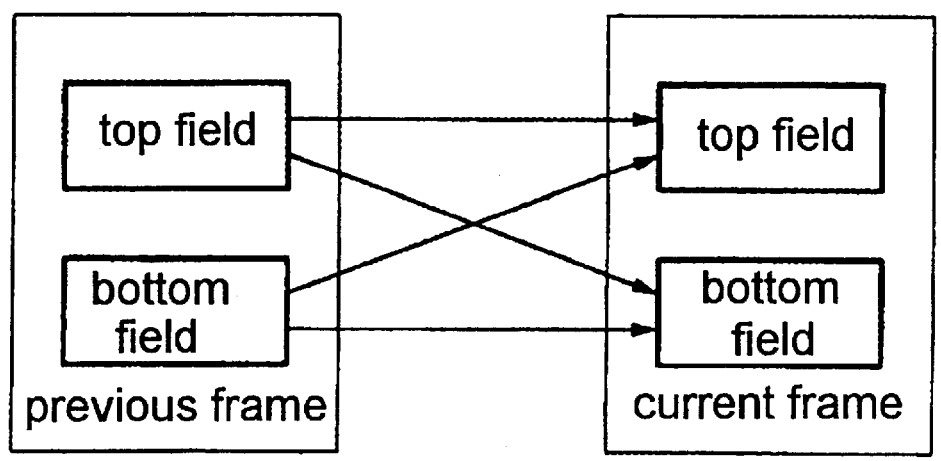
FIG. 7 is a view showing an example of previous field reference directions for field prediction.
Figure 8:
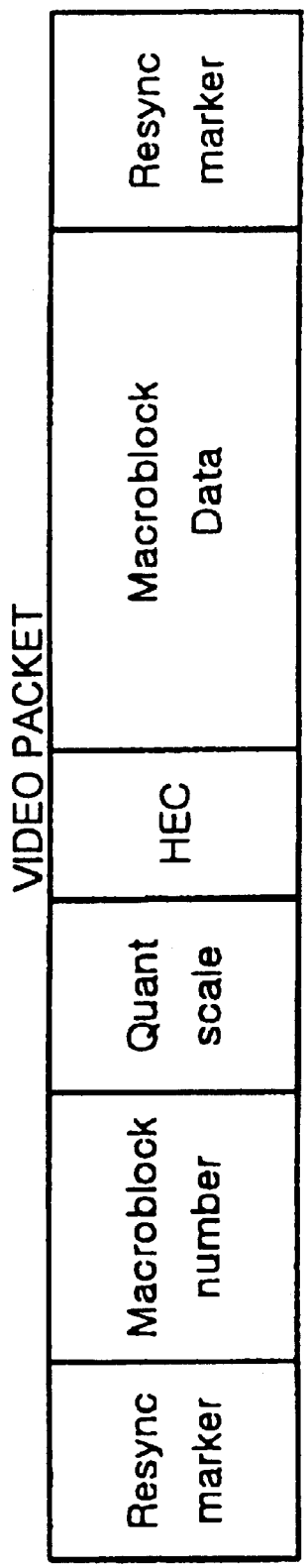
FIG. 8 is a view showing an example of an error resilient bitstream structure using a resynchronization signal.
Figure 9:
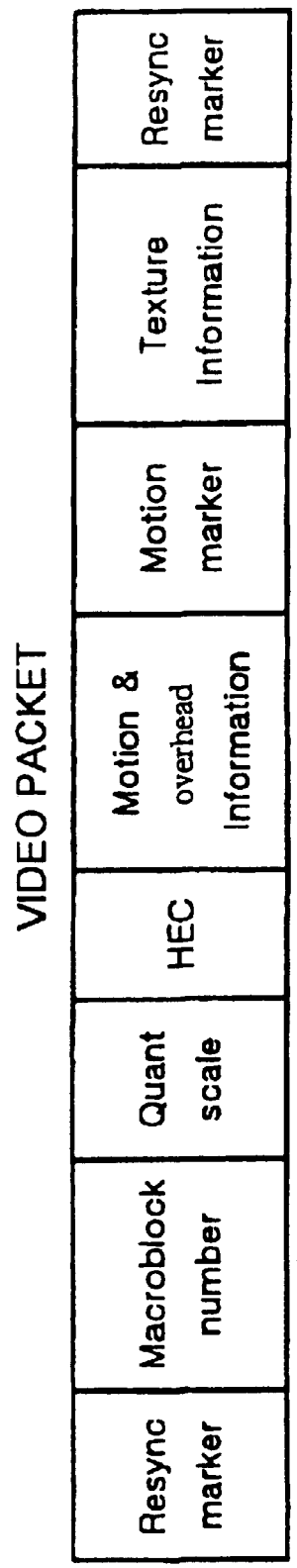
FIG. 9 is a view showing an example of an error resilient bitstream structure to which a data partitioning method is applied.
Figure 10:
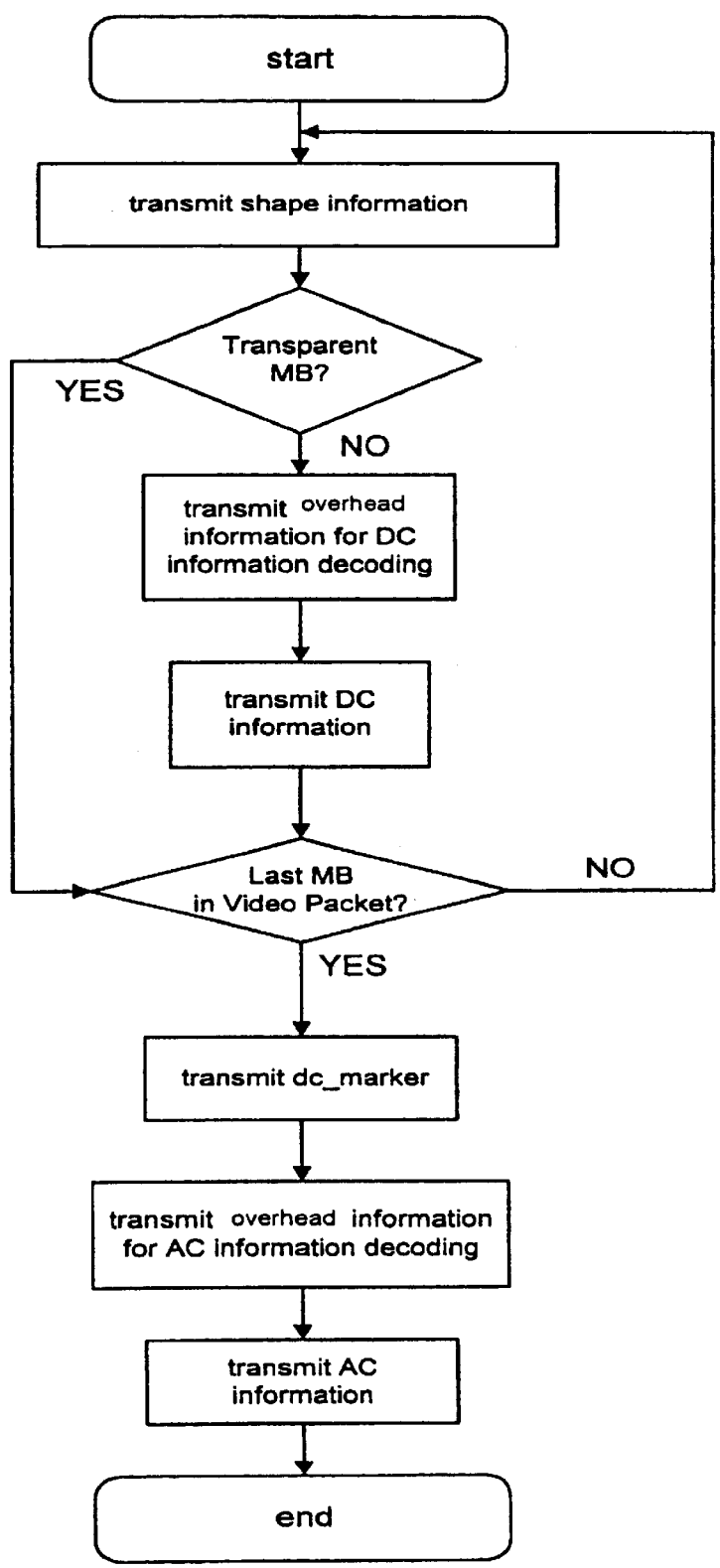
FIG. 10 is a flowchart illustrating a conventional video packet coding method for a progressive intra picture.
Figure 11:
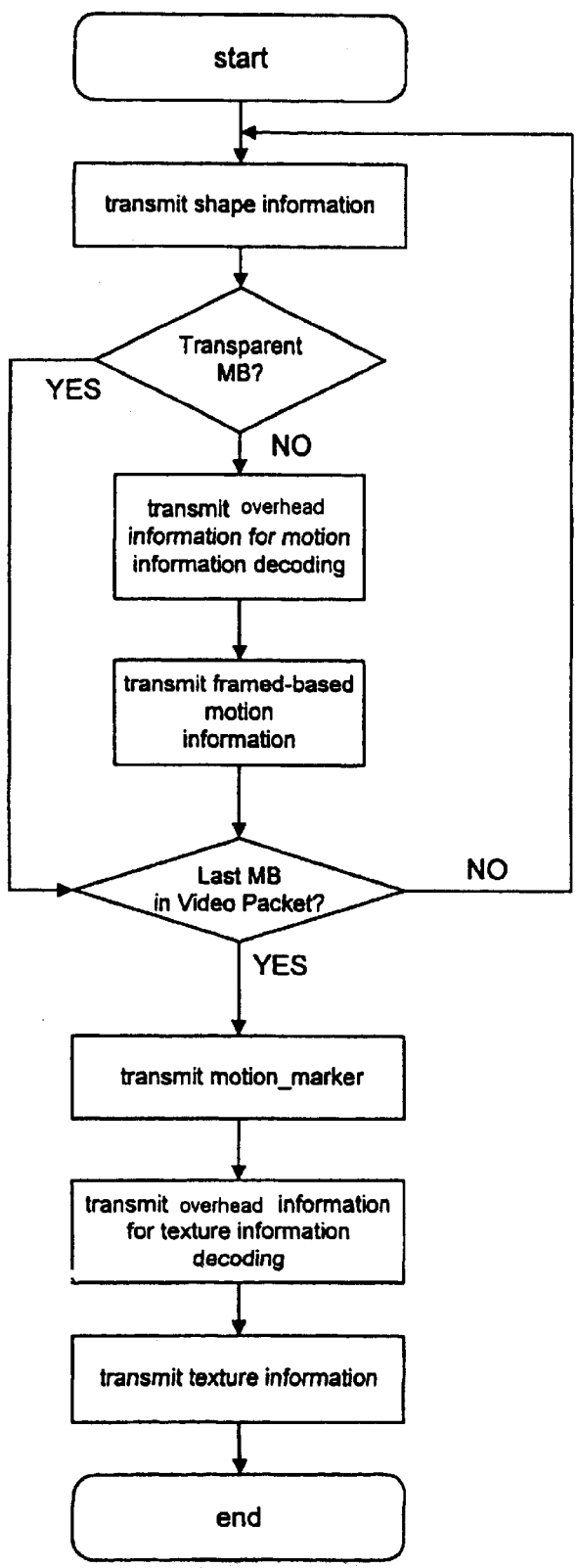
FIG. 11 is a flowchart illustrating a conventional video packet coding method for a progressive inter picture.

However, if the flag dct_type has been transmitted as in the present invention, the decoder can determine whether the block-unit DCT mode of the given macroblock is the frame mode or the field mode. Upon determining that the block-unit DCT mode of the given macroblock is the field mode, the decoder performs an inverse shuffling operation to reconstruct the final macroblock signal (see FIGS. 6a and 6b). Therefore, as compared with the conventional method transmitting no DCT type flag, the interlaced video compression-coding method of the present invention is capable of minimizing the channel error effect and allowing the decoder to reconstruct a moving picture of high quality.

Figure 14:
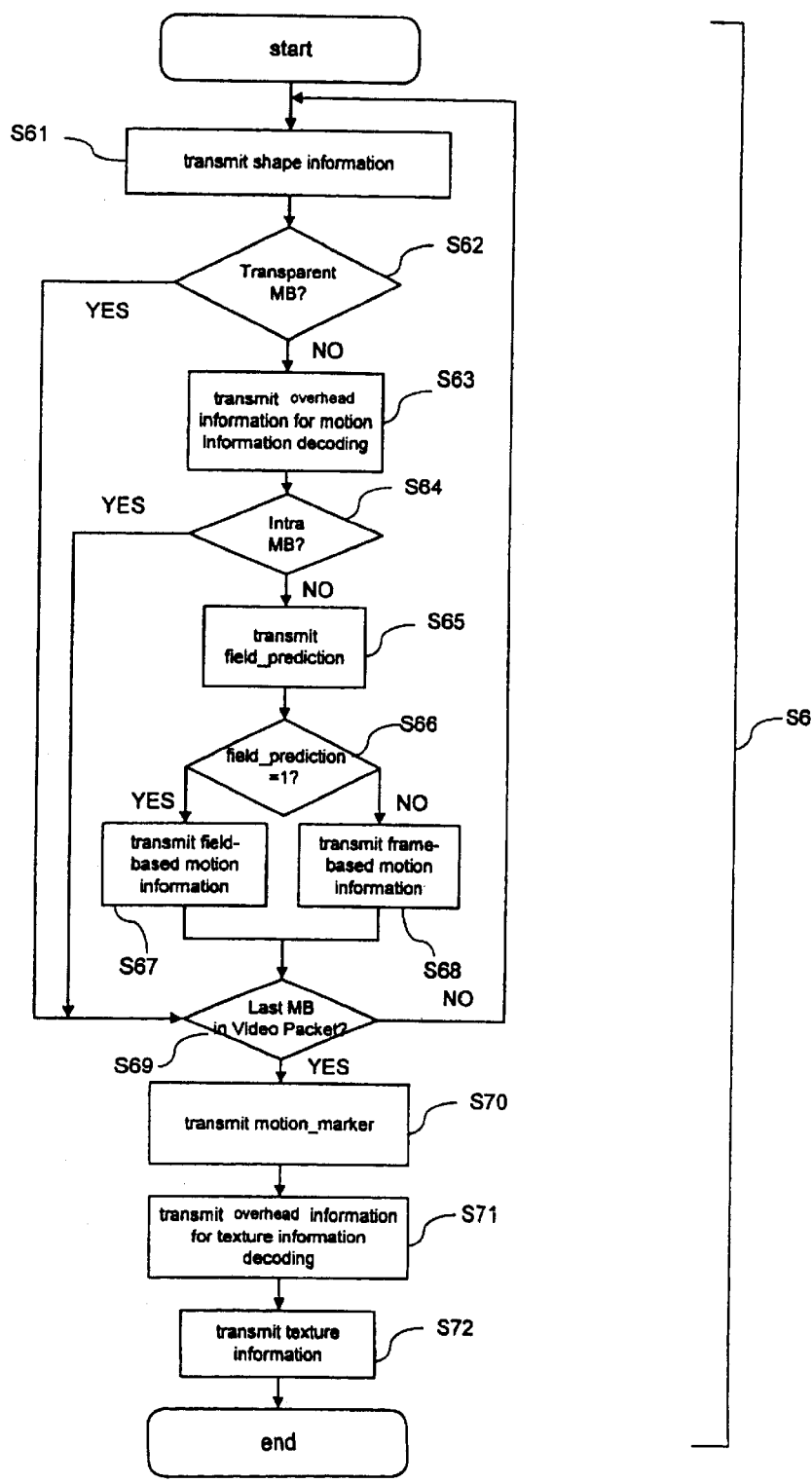
FIG. 14 is a flowchart illustrating a video packet coding method for an interlaced inter picture in accordance with the present invention.

FIG. 14 is a flowchart illustrating a video packet coding method for an interlaced inter picture in accordance with the present invention. The sixth step S6 in FIG. 12 of coding and transmitting the video packet in the interlaced inter picture manner will hereinafter be described in more detail with reference to FIG. 14.

First, for an object-based coding method, shape information of a given macroblock in the video packet to be coded is coded and the resultant shape information bitstream is transmitted to a decoder at step S61. It is determined at step S62 whether the given macroblock is a transparent macroblock with no object pixel. If the given macroblock is the transparent macroblock at step S62, the interlaced inter picture coding operation proceeds to step S69 because no further information to be transmitted is present. It should be noted that the present invention is applicable to a frame-based coding method as well as the object-based coding method. In the frame-based coding method, the shape information need not be transmitted and the shape information transmission step S61 and transparent macroblock determination step S62 are thus omitted.

If it is determined at the above step S62 that the given macroblock is not the transparent macroblock, overhead information for the decoding of motion information of the given macroblock is transmitted at step S63. The overhead information may preferably include information indicative of a coded macroblock (it indicates whether information to be transmitted is present in the given macroblock and is typically denoted as not_coded), macroblock type information and quantization scale information. It should be noted that the overhead information is not especially limited in the present invention, but it must essentially include macroblock type information indicative of whether the given macroblock is an inter macroblock based on a motion compensated prediction mode or an intra macroblock, not based on the motion compensated prediction mode. After the overhead information for the motion information decoding is transmitted at the above step S63, the macroblock type information is checked at step S64 to determine whether the given macroblock is the inter macroblock or the intra macroblock. If the given macroblock is the intra macroblock at step S64, the interlaced inter picture coding operation proceeds to step S69 because the motion information need not be transmitted. However, in the case where the given block is determined to be the inter macroblock step S64, information, field_prediction, is transmitted at step S65 to indicate whether the motion compensated prediction mode of the given macroblock is a frame mode or a field mode. The information field_prediction is checked at step S66 to determine whether the motion compensated prediction mode of the given macroblock is the frame mode or the field mode. If the motion compensated prediction mode of the given macroblock is the field mode at step S66, field-based motion information is transmitted at step S67. In the case where the motion compensated prediction mode of the given macroblock is determined to be the frame mode at step S66, frame-based motion information is transmitted at step S68. For example, when the information field_prediction has a value of "1", it may indicate the field-based motion compensated prediction mode of the given macroblock. The field-based motion information transmitted at the above step S67 includes motion information and information regarding a prediction direction of a given field. The frame-based motion information transmitted at the above step S68 includes one motion information per macroblock. Alternatively, the frame-based motion information may include four motion information per macroblock (one motion information per block). After the field-based or frame-based motion information is transmitted at the above steps S67 or S68, it is determined at step S69 whether the given macroblock is a last macroblock in the video packet to be coded. If the given macroblock is the last macroblock in the video packet to be coded, the interlaced inter picture coding operation proceeds to step S70. However, in the case where it is determined at step S69 that the given macroblock is not the last macroblock in the video packet to be coded, the interlaced inter picture coding operation returns to the above step S61 to process a new macroblock in the video packet to be coded. In the present invention, the last macroblock determination step S69 may be performed in various manners. For example, the length of each video packet can be set to a predetermined number of macroblocks (for example, a GOB structure in H.263) or a given video packet can be determined to be ended if the number of bits accumulated in the given video packet exceeds a predetermined threshold value (for example, the video packet structure in MPEG-4). In the present invention, the last macroblock determination step S66 is not limited to a specific manner.

If the given macroblock is determined to be the last macroblock in the video packet at the above step S69, a marker signal, motion_marker, is transmitted at step S70 to make a distinction between motion information and texture information of all macroblocks in the video packet. It is preferred that the marker signal motion_marker should be distinguished from all possible codes (variable length codes, resynchronization signals and start signals) in a moving video coding system to which the interlaced inter picture coding operation of FIG. 14 is applied. For example, in the MPEG-4 standard, a bitstream of "1 1111 0000 0000 0001" may be used as the marker signal motion_marker.

Then, overhead information for the decoding of the texture information of all the macroblocks in the video packet to be coded is transmitted at step S71. For example, the overhead information for the texture information decoding may include coded block pattern information, a signal ac_pred_flag, quantization scale information and a flag dct_type, as stated previously with reference to FIG. 13. Finally, the texture information, or DC and AC information, of all the macroblocks in the video packet to be coded is transmitted at step S72.

In a similar manner to FIG. 13, each of the above steps S71 and S72 has been shown to transmit the overhead information or texture information of all the macroblocks in the video packet at the same time. Alternatively, the above steps S71 and S72 may be performed with respect to each of the macroblocks in the video packet, sequentially from the first macroblock to the last macroblock.

The above steps S65 and S67 of the inter picture video packet coding method in FIG. 14 are the kernel of the present invention. If the marker signal motion_marker transmitted at step S70 is accurately decoded and the presence of a channel error is detected in the subsequently transmitted texture information, the texture information is neglected and the coded video packet is reconstructed on the basis of only the motion information preceding the marker signal motion_marker. At this time, according to the field_prediction information and field-based motion information, transmitted respectively at the above steps S65 and S67, the decoder can determine whether the motion compensated prediction mode of the given macroblock is the field mode or the frame mode and accurately decode the motion information on the basis of a field unit if the motion compensated prediction mode of the given macroblock is the field mode. Therefore, even when the texture information is lost due to the channel error, the decoder can accurately perform the field-based motion compensated prediction operation so as to minimize the channel error effect and reconstruct a moving picture of high quality.

Figure 15:
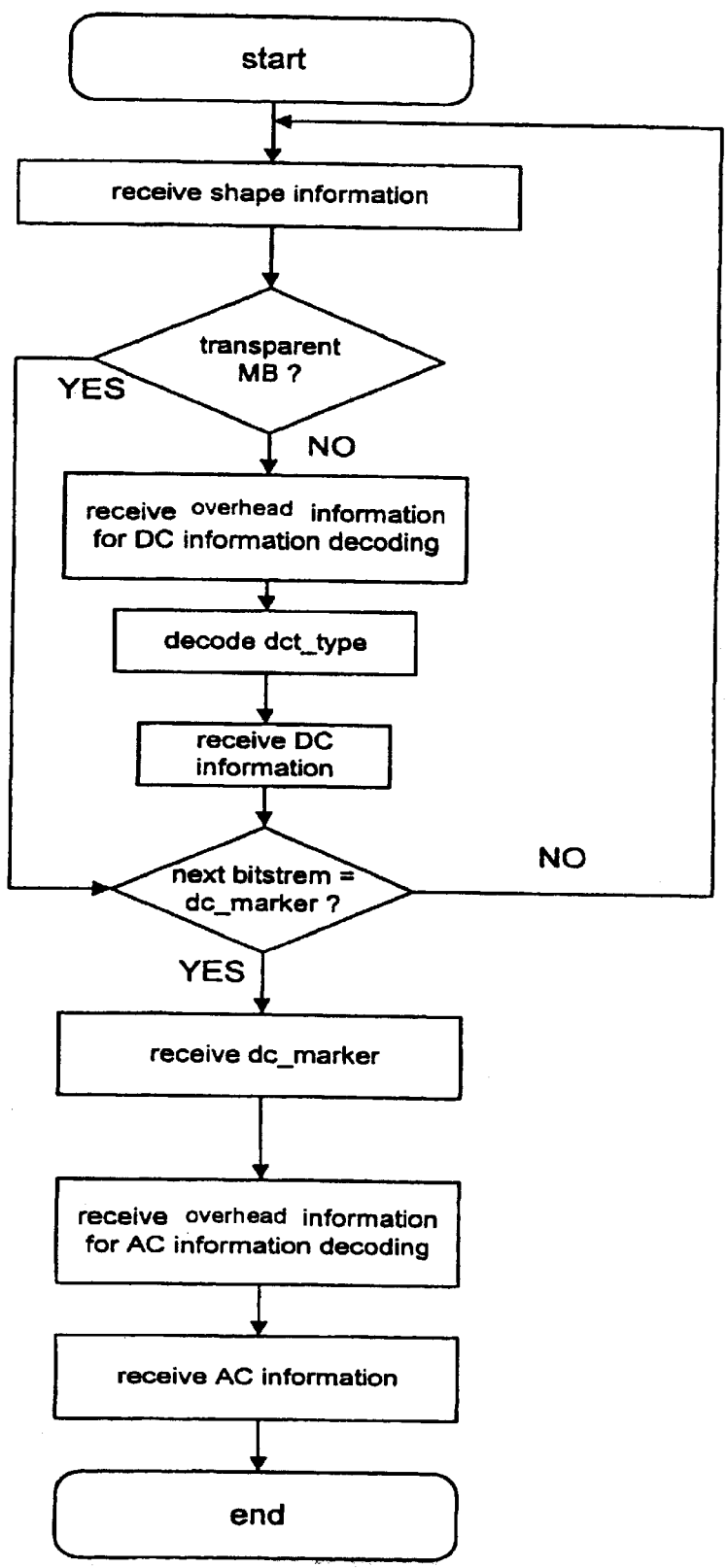
FIG. 15 is a flowchart illustrating a video packet decoding method for the interlaced intra picture in accordance with the present invention.
Figure 16:
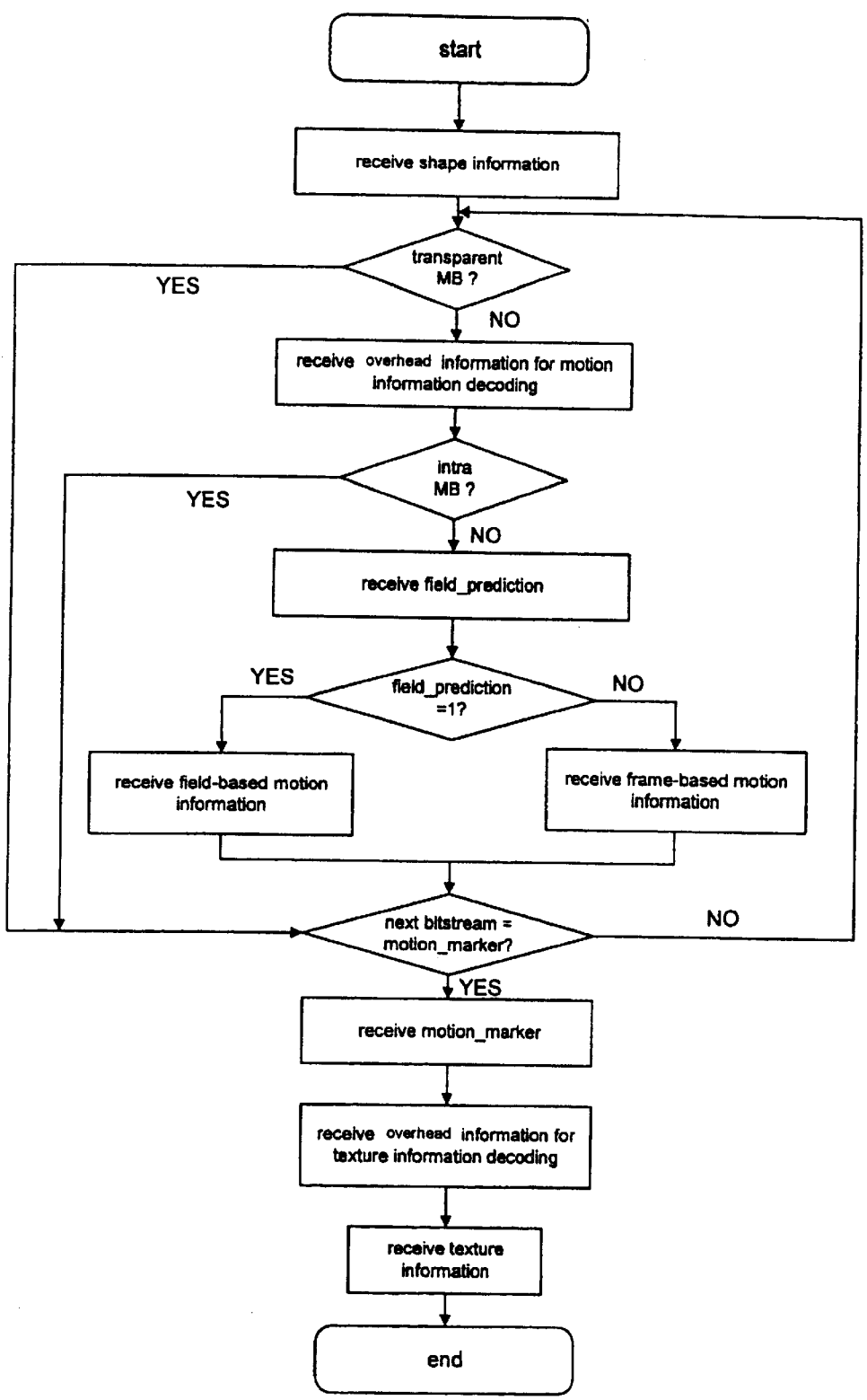
FIG. 16 is a flowchart illustrating a video packet decoding method for the interlaced inter picture in accordance with the present invention.

Until now, the video packet coding methods for the interlaced intra and inter pictures in accordance with the present invention have been described with reference to FIGS. 13 and 14, respectively. FIGS. 13 and 14 show information transmission flows of the coding methods similarly to FIG. 12. FIGS. 15 and 16 are flowcharts illustrating video packet decoding methods for the interlaced intra and inter pictures in accordance with the present invention, respectively. Information transmission flows of FIGS. 15 and 16 are substantially the same as those of FIGS. 13 and 14, respectively, so far as the term "transmit" is substituted with the term "receive". Therefore, a detailed description of the video packet decoding methods will be omitted.

The decoding methods of FIGS. 15 and 16 substantially have the same signal flows as those of the coding methods of FIGS. 13 and 14, respectively, with the exception that they perform control operations somewhat different from those of the coding methods. In the coding methods of FIGS. 13 and 14, the encoder recognizes the length of a given video packet and thus transmits a marker signal dc_marker or motion_marker if the packet length satisfies a specific condition. However, the decoder cannot recognize such a condition and should thus perform the following bitstream checking operation. In more detail, in the intra picture video packet decoding method of FIG. 15, upon receiving DC information, the decoder first checks whether the next bitstream is the marker signal dc_marker. Then, the decoder receives shape information of the next macroblock if the next bitstream is not the marker signal dc_marker, and the marker signal dc_marker if the next bitstream is the marker signal dc_marker. Similarly, in the inter picture video packet decoding method of FIG. 16, upon receiving motion information, the decoder first checks whether the next bitstream is the marker signal motion_marker. Then, the decoder receives shape information of the next macroblock if the next bitstream is not the marker signal motion_marker, and the marker signal motion_marker if the next bitstream is the marker signal motion_marker.

As apparent from the above description, according to the present invention, the data partitioning coding method is used to code an interlaced moving video. Then, information of coded video packets are transmitted to the decoder according to a transmission order proposed by the present invention. The decoder decodes the transmitted video packets according to a decoding order proposed by the present invention. Therefore, even when the coded, interlaced moving video is transmitted through a channel where a transmission error may often occur, the decoder can minimize a degradation in picture quality resulting from the transmission error.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for coding a digital interlaced moving video, comprising the steps of:
   a) transmitting picture-unit overhead information;
   b) determining whether a video packet to be coded is a first packet of a given picture;
   c) transmitting a video packet header including overhead information for an interlaced decoding operation if it is determined at said step b) that said video packet is not the first packet of the given picture;
   d) determining whether said given picture is an intra picture, if it is determined at said step b) that said video packet is said first packet of said given picture or after said video packet header is transmitted at said step c);
   e) coding and transmitting said video packet in an interlaced intra picture manner if it is determined at said step d) that said given picture is the intra picture;
   f) coding and transmitting said video packet in an interlaced inter picture manner if it is determined at said step d) that said given picture is not said intra picture; and
   g) determining whether said video packet is a last packet of said given picture, after it is coded and transmitted at said step e) or f), returning to said step b) if said video packet is not the last packet of said given picture and ending a digital interlaced coding operation if said video packet is said last packet of said given picture.

2. The method as set forth in claim 1, wherein said picture-unit overhead information at said step a) includes information indicative of whether said given picture is said inter picture or said intra picture, information indicative of which one of top and bottom fields is earlier in time than the other, and information indicative of a method for scanning DCT coefficients after DCT.

3. The method as set forth in claim 1, wherein said step e) includes the steps of:
   e-1) transmitting overhead information for the decoding of DC information of a given macroblock in said video packet;
   e-2) transmitting a flag indicative of whether a block-unit DCT mode of the given macroblock is a frame mode or a field mode;
   e-3) transmitting said DC information of said given macroblock;
   e-4) determining whether said given macroblock is a last macroblock in said video packet and returning to said step e-1) if said given macroblock is not the last macroblock in said video packet;
   e-5) transmitting a marker signal for making a distinction between DC information and AC information of all macroblocks in said video packet if it is determined at said step e-4) that said given macroblock is said last macroblock in said video packet;
   e-6) transmitting overhead information for the decoding of said AC information of all said macroblocks in said video packet; and
   e-7) transmitting said AC information of all said macroblocks in said video packet.

4. The method as set forth in claim 3, wherein said step e) further includes the steps of:

e-a) transmitting shape information of said given macroblock before said step e-1) is performed; and
   e-b) determining whether said given macroblock is a transparent macroblock, after said step e-a) is performed, proceeding to said step e-4) if said given macroblock is the transparent macroblock and proceeding to said step e-1) if said given macroblock is not said transparent macroblock.

5. The method as set forth in claim 3, wherein said overhead information for the DC information decoding at said step e-1) includes macroblock type information and quantization scale information.

6. The method as set forth in claim 3, wherein said step e-4) includes the step of determining whether said given macroblock is said last macroblock in said video packet, on the basis of the fact that the length of said video packet is set to a predetermined number of macroblocks or said video packet is determined to be ended if the number of bits accumulated in said video packet exceeds a predetermined threshold value.

7. The method as set forth in claim 3, wherein said overhead information for the AC information decoding at said step e-6) includes information indicative of whether an AC coefficient to be transmitted is present in each block of each of said macroblocks in said video packet, and information indicative of whether said AC information has been predictive-coded.

8. The method as set forth in claim 1, wherein said step f) includes the steps of:
   f-1) transmitting overhead information for the decoding of motion information of a given macroblock in said video packet;
   f-2) determining whether said given macroblock is an intra macroblock or an inter macroblock;
   f-3) transmitting information indicative of whether a motion compensated prediction mode of said given macroblock is a frame mode or a field mode, if it is determined at said step f-2) that said given macroblock is the inter macroblock;
   f-4) determining whether said motion compensated prediction mode of said given macroblock is the frame mode or the field mode;
   f-5) transmitting field-based motion information if it is determined at said step f-4) that said motion compensated prediction mode of said given macroblock is said field mode;
   f-6) transmitting framed-based motion information if it is determined at said step f-4) that said motion compensated prediction mode of said given macroblock is said frame mode;
   f-7) determining whether said given macroblock is a last macroblock in said video packet, if it is determined at said step f-2) that said given macroblock is the intra macroblock, after said field-based motion information is transmitted at said step f-5) or after said frame-based motion information is transmitted at said step f-6), and returning to said step f-1) if said given macroblock is not the last macroblock in said video packet;
   f-8) transmitting a marker signal for making a distinction between motion information and texture information of all macroblocks in said video packet if it is determined at said step f-7) that said given macroblock is said last macroblock in said video packet;
   f-9) transmitting overhead information for the decoding of said texture information of all said macroblocks in said video packet; and f-10) transmitting said texture information of all said macroblocks in said video packet.

9. The method as set forth in claim 8, wherein said step f) further includes the steps of:

f-a) transmitting shape information of said given macroblock before said step f-1) is performed; and f-b) determining whether said given macroblock is a transparent macroblock, after said step f-a) is performed, proceeding to said step f-7) if said given macroblock is the transparent macroblock and proceeding to said step f-1) if said given macroblock is not said transparent macroblock.

10. The method as set forth in claim 8, wherein said overhead information for the motion information decoding at said step f-1) includes information indicative of whether information to be transmitted is present in said given macroblock, macroblock type information indicative of whether said given macroblock is said intra macroblock or said inter macroblock, and quantization scale information.

11. The method as set forth in claim 8, wherein said field-based motion information at said step f-5) includes motion information and information regarding a prediction direction of a given field.

12. The method as set forth in claim 8, wherein said step f-7) includes the step of determining whether said given macroblock is said last macroblock in said video packet, on the basis of the fact that the length of said video packet is set to a predetermined number of macroblocks or said video packet is determined to be ended if the number of bits accumulated in said video packet exceeds a predetermined threshold value.

13. The method as set forth in claim 8, wherein said overhead information for the texture information decoding at said step f-9) includes information indicative of whether an AC coefficient to be transmitted is present in each block of each of said macroblocks in said video packet, information indicative of whether AC information has been predictive-coded, quantization scale information and DCT type information.

\* \* \* \* \*